United States Patent [19]
Kilk et al.

[11] Patent Number: 6,023,478
[45] Date of Patent: Feb. 8, 2000

[54] METHOD AND APPARATUS FOR COMMUNICATING DATA BYTE STREAMS

[75] Inventors: Erik Kilk, Battleground; Karen Van der Veer, Vancouver, both of Wash.; Leann M. MacMillan, West Linn, Oreg.

[73] Assignee: Hewlett-Packard, Palo Alto, Calif.

[21] Appl. No.: 08/626,225

[22] Filed: Mar. 29, 1996

[51] Int. Cl.[7] ...................................................... H04J 3/02
[52] U.S. Cl. ........................... 370/535; 370/537; 395/101
[58] Field of Search ...................................... 370/389, 392, 370/470, 471, 474, 535, 537, 538, 540, 542, 543, 544; 395/101, 114, 115, 854, 871

[56] References Cited

U.S. PATENT DOCUMENTS

| | | | |
|---|---|---|---|
| 4,328,559 | 5/1982 | Markhasin et al. | 364/900 |
| 4,491,945 | 1/1985 | Turner | 370/409 |
| 4,543,644 | 9/1985 | Kozima et al. | 395/431 |
| 5,123,061 | 6/1992 | Pritchard | 382/233 |
| 5,220,566 | 6/1993 | Ikenoue | 370/535 |
| 5,550,957 | 8/1996 | Davidson, Jr. et al. | 395/114 |
| 5,663,962 | 9/1997 | Caire et al. | 370/535 |

FOREIGN PATENT DOCUMENTS

| | | |
|---|---|---|
| 0194721A2 | 3/1986 | European Pat. Off. . |
| 1525623 | 9/1978 | United Kingdom . |
| WO86/03083A1 | 10/1985 | WIPO . |

*Primary Examiner*—Chi H. Pham
*Assistant Examiner*—William Luther

[57] ABSTRACT

The invention in its preferred embodiment involves a data producer such as a host processor that multiplexes two or more data byte streams onto a single communication link, whether serial or parallel, for transmission to a data consumer such as an ink-jet or laser printer, scanner or facsimile machine. The data are packetized with header information including a start byte, a destination channel ID byte and size byte. At the data consumer, the data under control of a state machine are header-stripped, unpacked, routed and stored in appropriate two or more ring buffers. Exception handling such as data loss or framing error recovery may be performed by the data consumer's communicating its status to the data producer or by the use of handshake lines such as READY or BUSY, rendering the invented method and apparatus compatible with unidirectional or bidirectional hardware links. The data consumer hardware, including the multiplexer, or selector, the state machine and various registers for holding channel information and byte count, operates relatively independently of the device's firmware-based controller so that there is very little software or firmware overhead during data reception.

1 Claim, 3 Drawing Sheets

METHOD AND APPARATUS FOR COMMUNICATING DATA BYTE STREAMS

TECHNICAL FIELD

The present invention relates generally to data communications between one or more data sources and one or more data destinations. More particularly, it concerns a method of multiplexing data from two or more data sources at a transmitter into a single data stream for communication over an input/output (IO) channel to a receiver for demultiplexing the data stream and unpacking the data bytes from the two or more data streams.

BACKGROUND ART

Often, multiple data type exchanges must occur between a transmitter and a receiver in a communication system. For example, in an ink-jet printer subsystem, image data and command data are sent by a host processor such as a personal computer (PC) or file server to the printer for interpretation of the commands and printing of the image data by the printer's controller. Conventionally, such command interpretation and image data printing are performed under firmware control on a byte-by-byte basis. Because printer subsystems are connected to a variety of host processors via a variety of IO ports using a variety of protocols, e.g. Multiple Logical Channels are used with many ink-jet and laser-jet printer products from Hewlett-Packard Co. and layered network architectures such as Internet and Apple-Talk™ are used in many data communications systems, it is difficult to construct a single scheme for such multiple-device communications. Most prior art solutions also require dedicated hardware in the host processor, as well as substantial memory and software or code. Finally, most prior art solutions require bidirectional IO hardware support.

DISCLOSURE OF THE INVENTION

The invention in its preferred embodiment involves a host processor that multiplexes two or more data byte streams onto a single communication link, whether serial or parallel, for transmission to a receiver device such as an ink-jet or laser printer. The data are packetized with header information including a start byte, a destination channel ID byte and a size word. At the receiver device, the data under control of a state machine are header-stripped, unpacked, routed and stored in appropriate two or more ring buffers. Exception handling such as data loss or framing error recovery may be performed by the receiver's communicating its status to the host processor or by the use of handshake lines such as READY or BUSY, rendering the invented method and apparatus compatible with unidirectional or bidirectional hardware links. The receiver device hardware, including the demultiplexer, the state machine and various registers for holding channel information and byte count, operates relatively independently of the device's controller so that there is very little software or firmware overhead during data reception. Firmware storage requirements are substantially reduced, and significant cost savings are realized.

These and other objects and advantages of the present invention will be more readily understood after a consideration of the drawings and the detailed description of the preferred embodiment which follows.

DETAILED DESCRIPTION OF THE PREFERRED EMBODIMENTS AND BEST MODE FOR CARRYING OUT THE INVENTION

Figure 1:
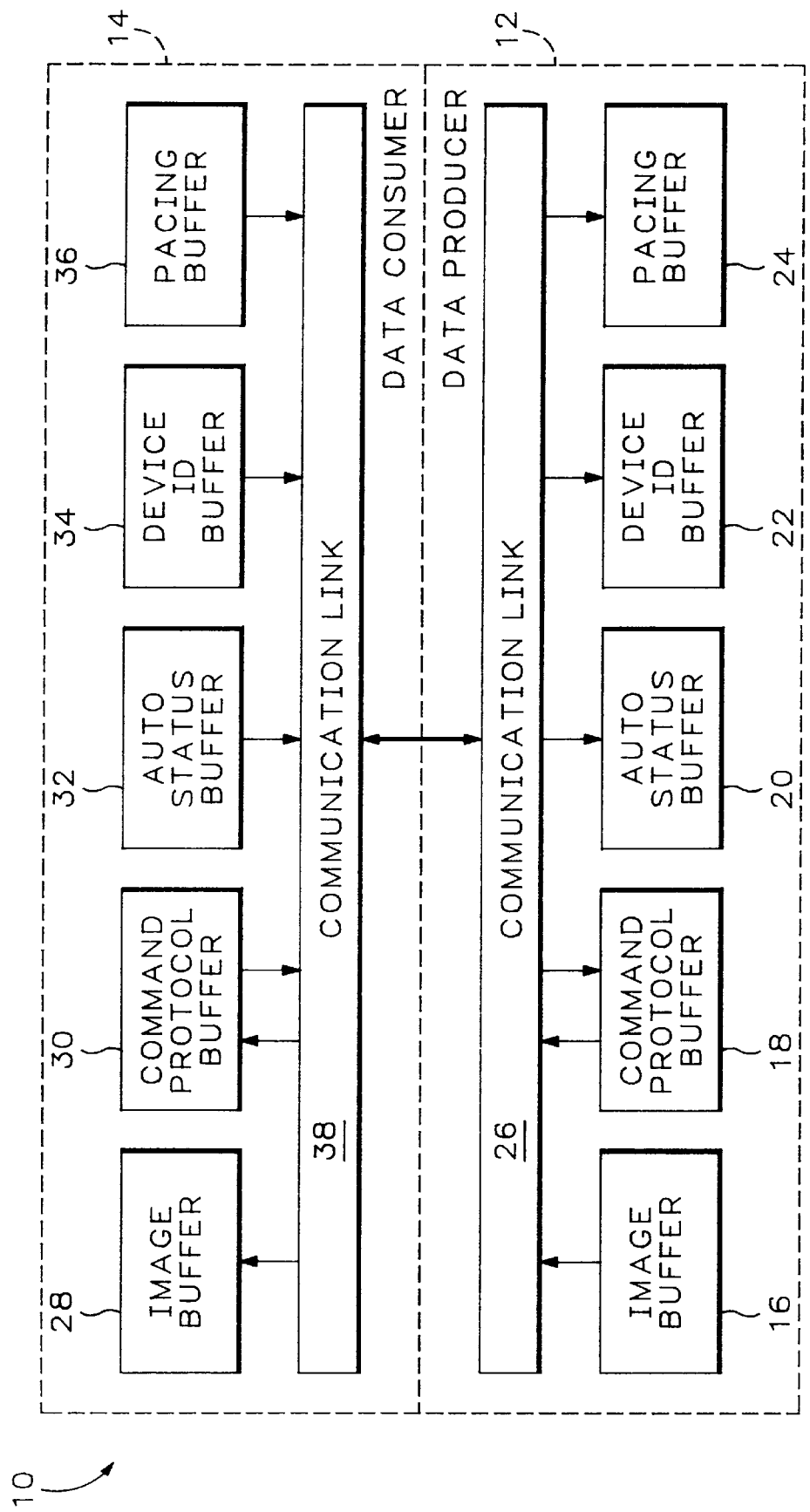
FIG. 1 is a system block diagram of the invented apparatus in its preferred embodiment.

FIG. 1 shows the invented apparatus in system block diagram form at 10. As may be seen apparatus 10 preferably includes a producer 12 and a consumer 14 of data. Those skilled in the art will appreciate that the direction of the arrows in FIG. 1 indicate the direction of the flow of information in the form of what will be referred to herein generally as data.

Those of skill in the arts will appreciate that data producer 12 may be a PC or file server, or any other data-producing device, and that data consumer 14 may be a printer, scanner, facsimile machine, or any other data-consuming device, within the spirit and scope of the invention. In the present disclosure, data producer 12 will be described and illustrated as a PC and data consumer 14 will be described and illustrated as an ink-jet printer. It will be appreciated also that reference herein to producer 12 as a producer and to consumer 14 as a consumer is meant as a description, not a limitation, i.e. it will be understood that producer 12 typically also is a consumer and that consumer 14 typically also is a producer of data. Communication, it will be understood, is a two-way street, although there may be times when it seems largely one-way.

Data producer 12 typically might include a memory and a processor capable of producing and storing an image buffer 16, a command protocol buffer 18, an auto-status buffer 20, a device ID buffer 22, a pacing buffer 24 and communication link hardware, software or firmware (communication link) 26. Similarly, data consumer 14 typically might include a memory and a processor capable of producing and storing an image buffer 28, a command protocol buffer 30, an auto-status buffer 32, a device ID buffer 34, a pacing buffer 36 and communication link hardware, software or firmware 38. Link hardware, software or firmware 26, 38 are the principal subject of the present invention, as they are processors within both data producer 12 and data consumer 14 and operate to establish unidirectional or bidirectional communication of data, commands, status and other information between producer 12 and consumer 14. It will be appreciated that, within the spirit and scope of the invention links 26, 38 may be implemented in hardware, software, firmware or any combination thereof.

Figure 2:
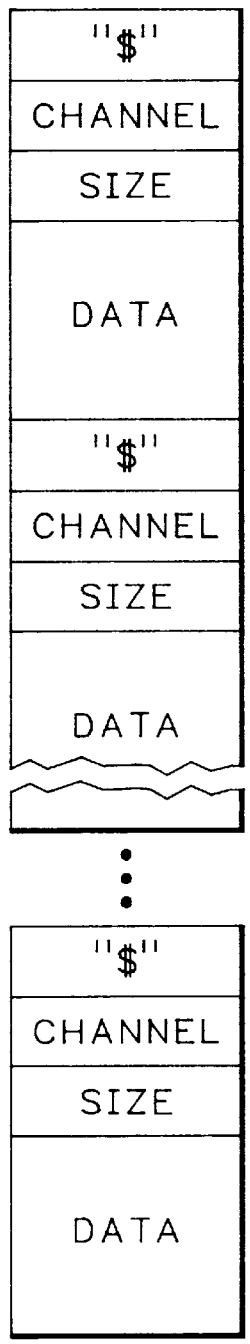
FIG. 2 is a schematic depiction of a data packet produced and consumed by the invented apparatus.

Turning to FIG. 2, it may be seen that data producer 12 packetizes data for transmission to data consumer 14 in accordance with a packetizing protocol implemented by link 26. The first byte of each packet in accordance with the preferred method and apparatus of the invention is an 8-bit start byte, e.g. the ASCII code for "$". The second byte of each packet is an 8-bit channel identifier or channel ID byte, which identifies the destination channel in data consumer 14 to which the packet is directed. The third and forth bytes of each packet are the packet size field, which defines the number of data bytes to follow before the end of packet will be assumed. Finally, the fifth and any subsequent bytes of each packet are the packet data. In accordance with the preferred method and apparatus of the invention, data may be up to 64 k-bytes (minus 1) long (where $k=2^{10}$), although it will be understood that alternative maximum data lengths are within the spirit and scope of the invention.

It will be appreciated that, in accordance with the invention, data may emanate from any one or more sources (as suggested by FIG. 2, which shows n such packets concatenated together into a single data stream), such as an image data buffer or a pacing buffer, and may be multiplexed into a packetized data stream for transmission from data producer 12 to data consumer 14 via any hardware communication link and under any software communication protocol used thereon. In other words, the invented multiplexing and packetizing method and apparatus do not care whether the multiplexed and packetized data are communicated bit serially, e.g. over a single bit-serial communication link, or over a plural-bit parallel communication link, or simply across a data bus of any bit width. Any and all such hardware transmission/reception schemes are contemplated, and are within the spirit and scope of the invention.

Referring still to FIG. 2, it will be seen that the data packet constructed in accordance with the preferred method and apparatus of the invention is of variable length, depending upon the length of its data field, which may be as short as zero bytes and as long as 64 k-bytes (minus 1). Accordingly, a wide variety of data may be communicated via the invented method and apparatus, including one or merely a few bytes of status information or a large pixel image buffer or anything therebetween. It is preferable, for reasons explained below, that the receiver of such packetized data not interpret the data; it is preferable instead that the receiver simply pass along the 'raw' unpacked data into a buffer for the receiver's application software to interpret.

Figure 3:
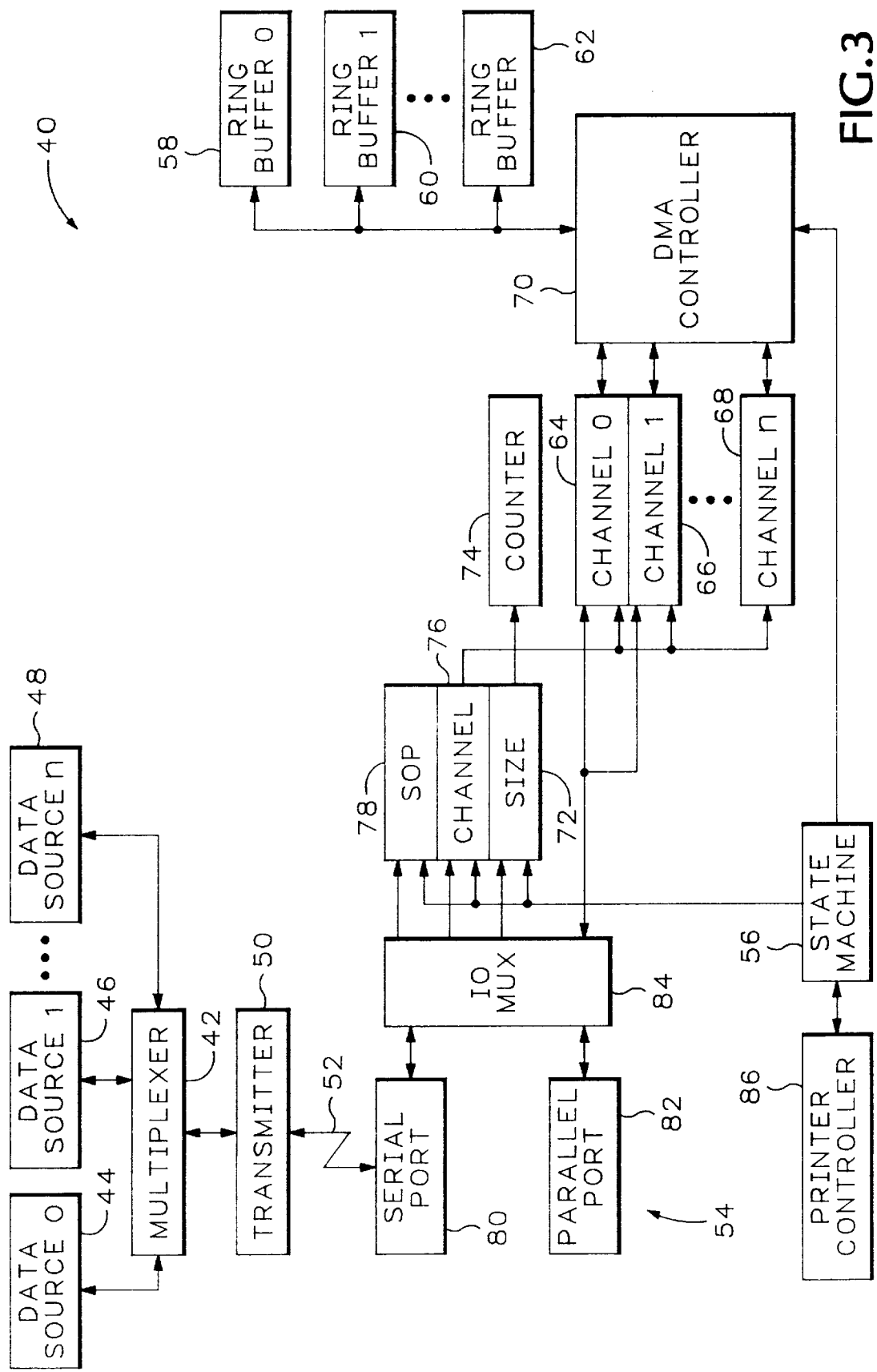
FIG. 3 is a detailed block diagram of a preferred embodiment of the hardware that forms a part of the invented apparatus.

Turning now to FIG. 3, the invented apparatus will be described in an alternative way. Invented apparatus 40 may be seen to be for multiplexing packetized data at a first location and for demultiplexing such packetized data at a second location. Preferably, apparatus 40 includes a multiplexer 42 for concatenating data packets (indicated in FIG. 3 by directed data flow lines) containing channel information from two or more data sources 44, 46, 48; and a transmitter 50 for communicating the concatenated packetized data along a single communication link 52 to a receiver. It will be understood that data sources 44, 46, 48, multiplexer 42 and transmitter 50 may be thought of collectively as a data producer like data producer 12. Apparatus 40 also preferably includes a data consumer like data consumer 14 including a receiver indicated generally at 54 for receiving the concatenated packetized data from single communication link 52; and a state machine 56 for controlling the unpacking and routing of the packetized data by decoding and stripping the channel information from each data packet and storing each of the data packets in each of two or more buffers 58, 60, 62 corresponding with the channel information. It will be appreciated that buffers such as ring buffers 58, 60, 62 correspond with two or more channels 64, 66, 68, which are data conduits that are more a logical than a physical construct in accordance with the preferred embodiment of the invention.

Apparatus 40 preferably further includes a direct memory access (DMA) controller 70 operatively connected with state machine 56 and with buffers 58, 60, 62 for writing the data packets into memory. Those of skill in the art will appreciate that, within the spirit and scope of the invention, any memory storage scheme may be used, but that DMA control is preferred because it removes processing overhead from printer controller 86 and reduces memory contention.

In accordance with the preferred embodiment of the invention in which the packetized data includes a header containing a packet data length indicator, as illustrated in FIG. 2, apparatus 40 further includes a first hardware register 72 ("SIZE") operatively coupled with state machine 56 for storing the length indicator. Also in accordance with the preferred embodiment of the invention in which each data packet contains zero or more data entities, apparatus 40 further includes a counter 74 operatively coupled with first hardware register 72 for indicating when the number of data entities contained in each data packet have been stored in a corresponding one of two or more buffers 58, 60, 62.

Further in accordance with the preferred embodiment of the invention in which the packetized data includes a destination channel identifier, apparatus 40 further includes a second hardware register 76 operatively coupled with state machine 56 for storing the channel identifier. Finally in accordance with the preferred embodiment of the invention in which the packetized data includes a start-of-packet (SOP) identifier, apparatus 40 further includes a third hardware register 78 operatively coupled with state machine 56 for comparing received concatenated packetized data with the predefined SOP identifier and for controlling registers 72, 76.

In some implementations of the invented apparatus, in which data packets may arrive at the second location via one of two or more input/output (IO) ports such as a serial port 80 and a parallel port 82, apparatus 40 may further include an IO multiplexer or selector 84 for selecting a conduit for data from one or the other of the IO ports. The printer's firmware-driven controller 86 may be conventional, although it will be appreciated that its firmware is greatly simplified, and its ROM (and perhaps RAM) capacity and cost greatly reduced, by use of the present invention.

Figure 4:
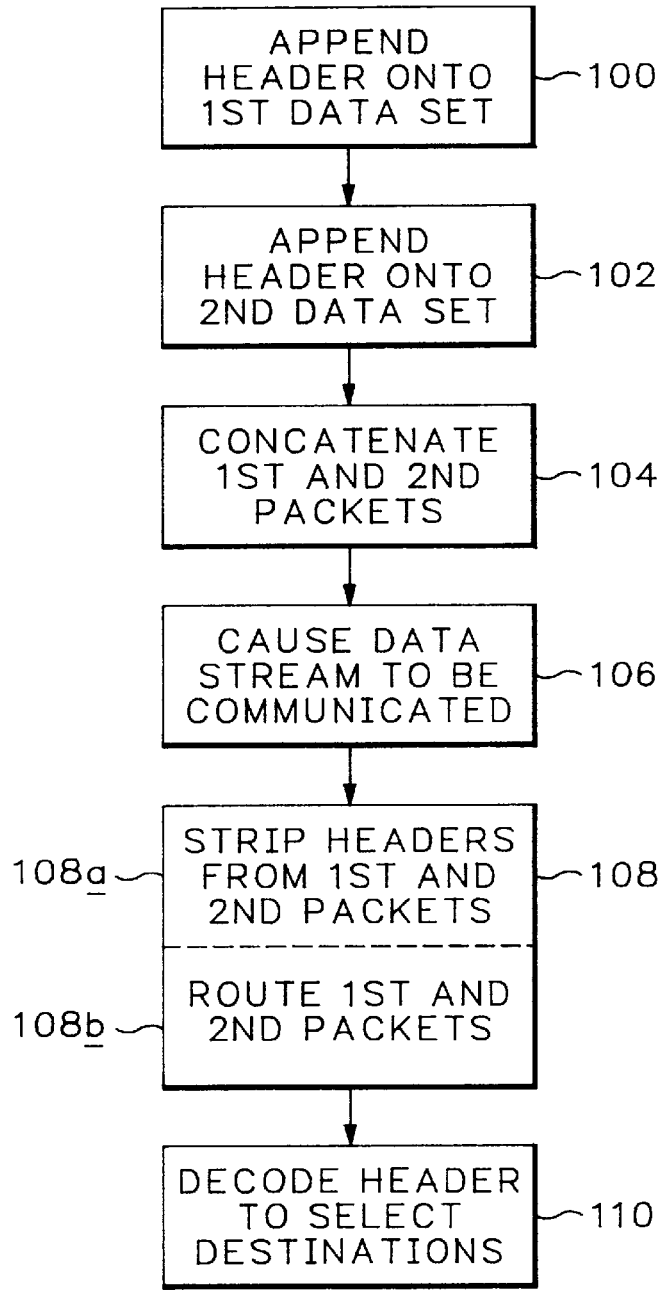
FIG. 4 is a flowchart of the preferred method of the invention.

Referring finally to FIG. 4, the preferred method of the invention may be understood by reference to a flowchart representing the manner in which apparatus 40 has been described to operate. It will be appreciated that flowcharting conventions have been adopted that result in a generally top-to-bottom, left-to right-control flow indicated by arrows, and that action blocks are indicated by rectangles and decision blocks by diamonds. The preferred method will be understood to be for multiplexing data from two data sources onto a single data communication link and for demultiplexing and storing the data into two data destinations. Preferably, the method includes 1) at 100, appending predefined header information onto a first set of data, the header information identifying a first destination for the first set of data, thereby to produce a first data packet; 2) at 102, appending predefined header information onto a second set of data, the header information identifying a second destination for the second set of data, thereby to produce a second data packet; 3) at 104, concatenating the first and the second data packets to produce a plural-packet data stream; 4) at 106, causing the data stream to be communicated over a single data link to the two data destinations; and 5) at 108, 5a) at 108a stripping the header information from the first and the second data packets within the data stream and 5b) at 108b routing the first and the second data packets to the appropriate one of the two data destinations based upon the destination-identifying header information for storage of the first and the second data packets.

Preferably, and as best illustrated in FIG. 2, the header information further includes a data length identifier for each of the first and the second data packets. Also preferably, the length identifiers are data unit counts, which further comprises storing each of said data length identifiers and using the same to indicate when each of the first and the second data packets have been routed for storage. Also preferably, the header information further includes a predefined start-of-packet indicator, although it will be appreciated that alternative methods of indicating a start of a packet, within the spirit and scope of the invention, may be devised.

Preferably, the invented method further includes 6) at 110, decoding the destination-identifier header information to select the first and the second of said two data destinations. As is pointed out above by reference to FIG. 4, it is preferable that the routing for storage sub-step 5b), indicated in FIG. 4 at 108b is performed via direct memory access, as by use of DMA controller 70.

Exception handling may be performed in accordance with the invented method and apparatus in a number of ways. In a preferred printer subsystem embodiment of the invention, if the printer detects loss of data or packet framing, it takes two distinct actions that render the protocol compatible with a variety of host processors. First, the printer controller firmware sends auto-status to the host processor indicating that it has experienced a loss of data or frame sync. The firmware also times out for a few seconds and then begins again to look for a start-of-packet byte. Thus, regardless of whether the printer driver software on the host processor polls the auto-status of the printer, nevertheless it may continue to send printer pixel image data and commands to the printer, with the loss of data or sync resulting simply in an easily detected missing or garbaged page. This unique feature enables the invented method and apparatus to operate with nearly any driver software and with any IO port hardware or software protocol, whether unidirectional or bidirectional.

Industrial Applicability

Accordingly, it may be seen that the invented method and apparatus provide a significant cost savings by facilitating the communication of source data via packets to one or more intended destination buffers. It does so by handling the packets very simply and transparently and by routing them via a simple DMA hardware state machine into the selected channel buffer. Very little packet overhead is required, yet exception handling is provided in the event of lost data or framing error. Thus firmware and its attendant RAM and ROM hardware support circuitry is reduced by more than half an order of magnitude. The invented method and apparatus are compatible with existing host processors and IO hardware links, whether unidirectional or bidirectional. A unique pacing technique is provided between data producers and data consumers so that the former does not overrun the latter. The performance of printers, scanners, facsimile equipment, and other devices is greatly enhanced by use of the invention.

We claim:

1. Apparatus for multiplexing packetized data at a first location and for demultiplexing such packetized data at a second location in which data packets may arrive at the second location via one of two or more input/output (IO) ports, the apparatus comprising:

a multiplexer for concatenating data packets containing channel information from two or more data sources;

a transmitter operatively connected with said multiplexer for communicating said concatenated packetized data along a single communication link to a receiver;

a receiver coupled with the communication link for receiving said concatenated packetized data therefrom;

a state machine operatively coupled with said receiver for controlling an unpacking and routing of said packetized data by decoding and stripping said channel information from each data packet and storing each of said data packets in each of one or more buffers corresponding with said channel information; and an IO multiplexer for selecting a conduit for data from one or the other of the IO ports.

* * * * *